United States Patent
Moccio et al.

(10) Patent No.: US 7,625,038 B2
(45) Date of Patent: Dec. 1, 2009

(54) AUTOMOTIVE SIDE DOOR AIR BIND REDUCTION GROMMET

(75) Inventors: Craig Moccio, Milan, MI (US); Paul Repp, Dearborn, MI (US); Thomas Leung, Boston, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 11/652,835

(22) Filed: Jan. 12, 2007

(65) Prior Publication Data

US 2008/0169672 A1 Jul. 17, 2008

(51) Int. Cl.
*B60J 9/00* (2006.01)
(52) U.S. Cl. ........................ 296/208; 296/154
(58) Field of Classification Search ............... 296/152, 296/154, 208; 174/650, 153 G, 152 R, 152 G, 174/135; 49/502; 454/70, 141, 142, 162–165
See application file for complete search history.

(56) References Cited

U.S. PATENT DOCUMENTS

| 127,559 | A | | 6/1872 | Bruce |
|---|---|---|---|---|
| 3,151,905 | A | * | 10/1964 | Reuther et al. ............. 49/167 |
| 3,382,889 | A | | 5/1968 | Heinz ..................... 137/525.3 |
| 3,392,654 | A | * | 7/1968 | Grenier ...................... 454/75 |
| 3,701,560 | A | * | 10/1972 | Emmerson ................. 296/154 |
| 3,805,684 | A | * | 4/1974 | Atkinson ................... 454/164 |
| 4,691,623 | A | * | 9/1987 | Mizusawa ................... 454/164 |
| 5,205,781 | A | * | 4/1993 | Kanno et al. ............... 454/164 |
| 5,448,017 | A | | 9/1995 | Nakajima ............... 174/152 G |
| D401,907 | S | | 12/1998 | Gazerro ..................... D13/155 |
| 6,682,119 | B1 | | 1/2004 | Droulez .................... 296/39.3 |
| 6,901,627 | B2 | * | 6/2005 | Uchida ....................... 16/2.1 |
| 7,020,931 | B1 | * | 4/2006 | Burnett et al. ................ 16/2.2 |
| 2004/0046424 | A1 | * | 3/2004 | Nakajima ................... 296/208 |
| 2005/0225121 | A1 | * | 10/2005 | Schoemann et al. ......... 296/208 |
| 2007/0137884 | A1 | * | 6/2007 | Fuller et al. ............ 174/153 G |
| 2007/0175661 | A1 | * | 8/2007 | Case .......................... 174/650 |
| 2008/0076344 | A1 | * | 3/2008 | Flowerday .................. 454/162 |
| 2009/0014203 | A1 | * | 1/2009 | Bikhleyzer ............. 174/153 G |

FOREIGN PATENT DOCUMENTS

JP 58156463 A * 9/1983

* cited by examiner

*Primary Examiner*—Patricia L Engle
(74) *Attorney, Agent, or Firm*—Gregory Brown; Miller Law Group, PLLC

(57) ABSTRACT

A side door grommet is formed in an L-shaped configuration to be seated in a side door between the primary and secondary door seals to release air pressure experienced when the side door is closed against the body shell. The grommet includes an L-shaped tube that allows air to pass into the interior of the side door and bends downwardly to prevent the passage of water from the interior of the side door through the grommet tube into the sealed area of the side door. A grill is mounted in the grommet to prevent the passage of small fingers and/or toys through the grommet into the interior of the side door. The release of the air bind between the primary and secondary seals allows the side door to be closed with a minimum of effort.

17 Claims, 2 Drawing Sheets

AUTOMOTIVE SIDE DOOR AIR BIND REDUCTION GROMMET

FIELD OF THE INVENTION

This invention relates generally to a side door assembly in an automotive vehicle and, more particularly, to a grommet to allow a release of air pressure to facilitate closure of the side door.

BACKGROUND OF THE INVENTION

Sealing architecture for side doors in automotive vehicles can require a pair of spaced apart elastomeric seals that seal the side door against the body of the vehicle. The closure of such side doors traps a volume of air between the two spaced apart elastomeric seals, causing an excess amount of resistance when a person is trying to close the side door. This resistance is commonly referred to as "air bind". This excess air bind increases the amount of closing force required to fully close a side door on an automotive vehicle, resulting in customer dissatisfaction.

A snorkel-shaped grommet utilized in an electrical cable running guide is disclosed in U.S. Design Pat. No. D401,907, granted to Peter Gazerro on Dec. 1, 1998. A ventilator for a railroad car is formed to include a wire cloth cover to exclude flying bodies from entering the ventilator, while allowing the passage of air to be carried through the down cast ducts into the interior of the railroad car, in U.S. Pat. No. 127,559, granted on Jun. 4, 1872, to James Henry Bruce. In U.S. Pat. No. 3,382,889, issued on May 14, 1968, to Walter Heinz, a sealing means is provided with an integral central web and a shield portion, although the sealing means does not appear to be positioned on the door edge.

A grommet for a wire harness extending through two panels is disclosed in U.S. Pat. No. 5,448,017 issued to Hiroyuki Nakajima, et al on Sep. 5, 1995, that is provided with a second member having a panel-installing portion and a cylindrical wire portion bent in an L-shaped configuration. A rib is formed on the peripheral surface of the wire portion. While in U.S. Pat. No. 6,682,119, granted on Jan. 27, 2004, to Eric Droulez, a grommet is provided for a soundproof partition to permit communication between two different regions on opposing sides of the soundproof partition. In none of the above-identified prior art documents is a grommet disclosed for use in an automotive door to relieve the air pressure generated between a pair of spaced seals to allow the door to close with less effort.

It would be desirable to provide a device cooperable with the side door of an automotive vehicle to permit the release of air pressure generated between two spaced seals on the side door when the door is closed.

SUMMARY OF THE INVENTION

It is an object of this invention to overcome the aforementioned disadvantages of the known prior art by providing a grommet in the surface of a side door in an automobile between a pair of spaced elastomeric seals to relieve air pressure generated between the spaced apart seals with the closing of the side door against the vehicle body.

It is another object of this invention to provide a grommet for the release of air pressure upon the closing of a side door in an automotive vehicle without subjecting the sealed area to an infiltration of moisture.

It is a feature of this invention that grommet exposes an opening between the door seal area and the interior of the side door.

It is another feature of this invention that the grommet has a snorkel shape that bends downwardly into the interior of the side door to prevent the influx of water from inside the door through the grommet.

It is an advantage of this invention that the air bind in the side door is eliminated and the door is operable to close with a minimal effort.

It is another advantage of this invention that the seals will not be subject to freezing due to the infiltration of water from the interior of the side door to the sealed area of the side door.

It is still another feature of this invention that the distal end of the grommet tube is provided with a lip to deflect water from entering the grommet tube.

It is yet another feature of this invention that the face of the grommet tube is provided with a grille to prevent the passage of foreign bodies into the interior of the side door.

It is still another advantage of this invention that the grill prevents children's fingers and toys, etc. from entering into the grommet tube to be passed into the interior of the side door.

It is yet another feature of this invention that the grommet is designed to be installed in only one orientation to prevent the grommet from being installed upside down.

It is still another advantage of this invention that the grommet is an aesthetically appealing solution to the problem of reducing air bind.

It is yet another feature of this invention that the grommet is molded into a rubber seal extending around the grommet to prevent the passage of water from the interior of the side door past the grommet.

It is a further object of this invention to provide a side door grommet to reduce air bind experienced when closing the automotive side door, that is durable in construction, inexpensive of manufacture, carefree of maintenance, facile in assemblage, and simple and effective in use.

These and other objects, features and advantages are accomplished according to the instant invention by providing a side door grommet that is formed in an L-shaped configuration to be seated in a side door between the primary and secondary seals of the door to release air pressure experienced when the side door is closed against the body doorjamb. The grommet includes an L-shaped tube that is in communication with the interior of the side door and bends downwardly to prevent the passage of water from the interior of the side door through the grommet tube into the sealed area of the side door. A grill is mounted on the grommet to prevent the passage of small fingers and/or toys through the grommet into the interior of the side door. The release of the air bind between the primary and secondary seals allows the side door to be closed with a minimum of effort.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
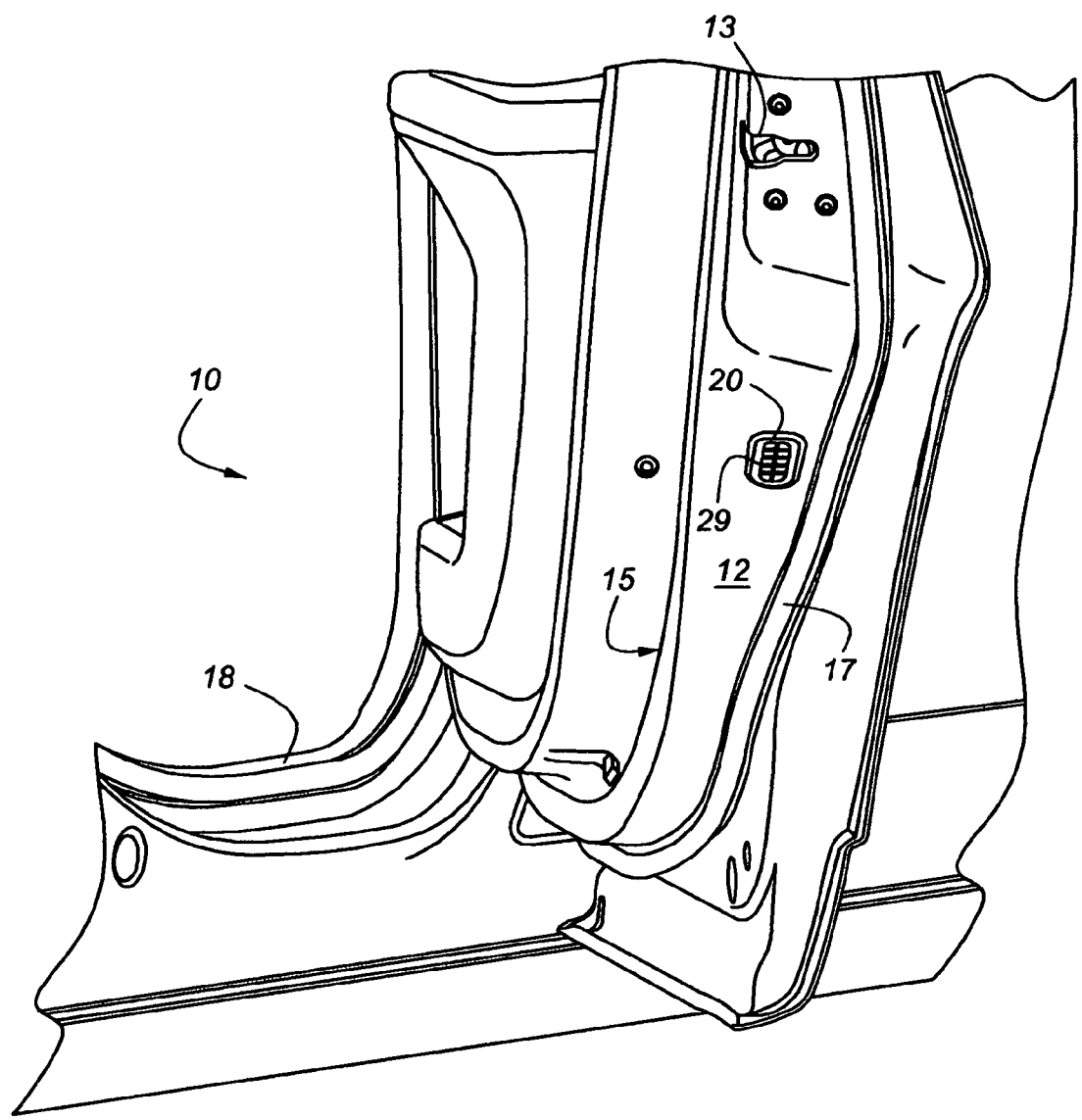
FIG. 1 is a perspective view of a side door having a grommet formed therein and incorporating the principles of the instant invention.
Figure 2:
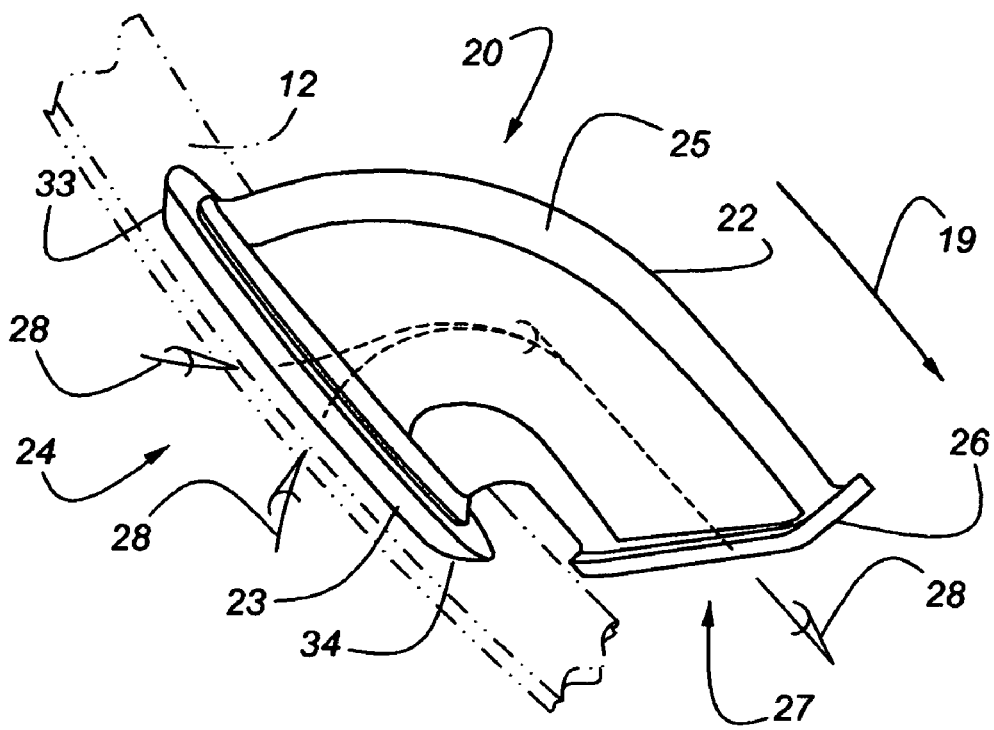
FIG. 2 is a side elevational view of the grommet with directional arrows indicating the direction of air flow through the grommet from the sealed area into the interior of the side door in which the grommet is mounted.
Figure 3:
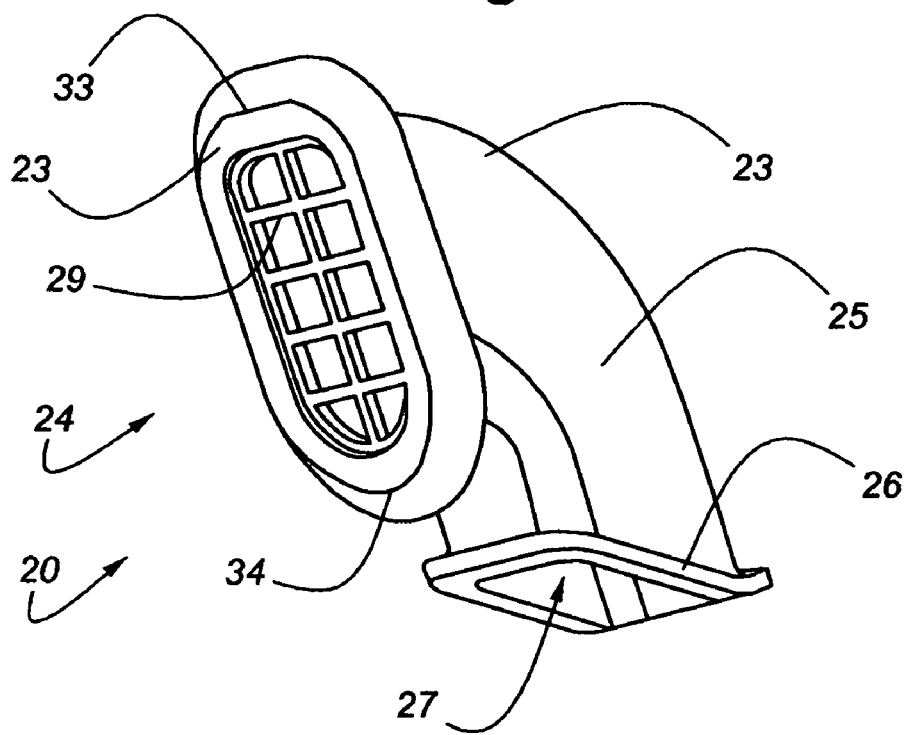
FIG. 3 is a perspective view of the grommet showing the grill and the edge formed in the distal end of the grommet tube to help deflect water from passing internally of the side tube.

Referring to FIGS. 1-3, a side door for an automotive vehicle incorporating the principles of the instant invention can best be seen. The side door assembly 10 has an inner shell 12 typically formed of sheet metal and being configured to close against the body of the vehicle with the latch 13 retained on a conventional latch keeper, as is known in the art. The side door assembly 10 has a Level 2 sealing architecture that includes a door mounted primary seal 17 that seals against the body and a body mounted secondary seal 18 that seal against a lip 15 formed in the door assembly 10 to define a secondary sealing plane to prevent the passage or air or water through the door opening into the passenger compartment of the vehicle. One skilled in the art will recognize that the side door assembly 10 can have a retractable window that will allow the passage of rain water into the interior of the door assembly 10, which will flow from the upper portions of the door assembly 10 toward the bottom portion where a drain is provided for the discharge of the water from the interior of the door assembly 10.

The Level 2 sealing architecture with the laterally spaced primary and secondary seals 17, 18, traps air between the two seals 17, 18 and, thereby, causes a resistance to closing the door assembly 10 against the body, called an air bind. To relieve that air pressure encountered between the primary and secondary seals 17, 18, the shell 12 of the door assembly 10 is provided with a grommet assembly 20 that establishes a vent into the interior of the door assembly 10. With the grommet assembly 20 installed, the air pressure cannot increase between the primary and secondary seals 17, 18.

The grommet assembly 20 includes a one piece tubular member 22 which is preferably molded in rubber, or can be formed in plastic with a rubber molding at the head 23 thereof. The tubular member 22 includes a head 23 that is engaged with the door shell 12 and a snorkel 25 terminating in a contoured lip 26. The snorkel portion 25 encompasses an angular turn of approximately 90 degrees from the opening 24 defined in the head 23 to the opening 27 defined by the contoured lip 26. The contoured lip 26 extends around the opening 27 and projects outwardly from the snorkel 25 to direct water, represented by the flow direction arrow 19, away from the opening 27. Preferably, the head 23 is formed in a manner that only allows the installation of the grommet assembly 20 in only one direction with the opening 27 being positioned lower in the door assembly 10 than the opening 24. For example, the head 23 can be formed with a square top edge 33 and a rounded bottom edge 34 that will only fit into a correspondingly formed hole in the shell 12 in one direction. Thus, the snorkel 25 cannot be installed in an upwardly directed manner so that the opening 27 will be above the opening 24.

The head 23 of the grommet assembly 20 will preferably be formed with a grille 29 that will prevent the insertion of small objects, such as a child's hand or small toys, into the opening 24, while maintaining a flow communication for the movement of air, as represented in FIG. 2 by the arrows 28, between the air bind area between the primary and secondary seals 17, 18 and the interior of the door assembly 10. Preferably, the grille 29 will be assembled into the head portion 23, though alternatively, the grille can be integrally molded into the head portion 23 of the grommet assembly 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A grommet assembly for a side door assembly in an automotive vehicle, said side door assembly including a shell on which is mounted a primary seal and a laterally spaced secondary sealing surface engageable with a secondary seal defining an air bind area between the primary and secondary seals, comprising:
    a head portion engageable with said shell to define an inlet opening through said shell between said primary seal and said secondary seal for flow communication of air between said air bind area and an interior of said door assembly; and
    a snorkel portion formed as a hollow tubular member having said head portion at one end thereof and terminating in an opposing distal opening, said snorkel portion undergoing a bend such that said distal opening will be positioned below said inlet opening when properly installed in said door shell.

2. The grommet assembly of claim 1 wherein said snorkel portion includes a contoured lip extending around said distal opening and projecting outwardly from said snorkel portion to deflect water away from said distal opening.

3. The grommet assembly of claim 2 wherein said head portion is formed in a unidirectional configuration so that said grommet assembly can only be installed into said door shell with said distal opening below said inlet opening.

4. The grommet assembly of claim 3 wherein said head portion is formed with a first flat edge and an opposing rounded edge to provide said unidirectional configuration.

5. The grommet assembly of claim 3 wherein said head portion includes a grille to prevent the entry of objects into said inlet opening.

6. The grommet assembly of claim 5 wherein said grommet assembly is molded from an elastomeric material in one piece including said head portion and said snorkel portion.

7. The grommet assembly of claim 5 wherein said snorkel portion is molded in plastic, said head portion including an elastomeric molding engageable with said door shell.

8. The grommet assembly of claim 5 wherein said grille is assembled in said head portion.

9. In an automotive vehicle having a body mounting a side door assembly including a shell on which is mounted a primary seal and a laterally spaced secondary sealing surface engageable with a secondary seal mounted on said body, said primary and secondary seals defining an air bind area therebetween, the improvement comprising:
    a grommet assembly mounted in said door shell between said primary and secondary seals to provide a vent for the flow of air from said air bind area into an interior portion of said side door assembly, said grommet assembly including:
    a head portion engageable with said shell to defining an inlet opening through said shell for flow communication of air between said air bind area and an interior of said door assembly; and
    a snorkel portion formed as a hollow tubular member having said head portion at one end thereof and terminating in an opposing distal opening, said snorkel portion undergoing a bend such that said distal opening will be positioned below said inlet opening when properly installed in said door shell to restrict any movement of moisture from said interior portion of said side door assembly into said air bind area.

10. The grommet assembly of claim 9 wherein said head portion includes a grille to prevent the entry of objects into said inlet opening.

11. The grommet assembly of claim 10 wherein said bend in said snorkel portion includes an angular displacement of approximately 90 degrees, such that said distal opening is oriented substantially perpendicularly to said inlet opening.

12. The automotive vehicle of claim 9 wherein said snorkel portion includes a contoured lip extending around said distal opening and projecting outwardly from said snorkel portion to deflect water away from said distal opening.

13. The automotive vehicle of claim 9 wherein said head portion is formed in a unidirectional configuration so that said grommet assembly can only be installed into said door shell with said distal opening below said inlet opening.

14. The automotive vehicle of claim 13 wherein said head portion is formed with a first flat edge and an opposing rounded edge to provide said unidirectional configuration.

15. The automotive vehicle of claim 14 wherein said grommet assembly is molded from an elastomeric material in one piece including said head portion and said snorkel portion.

16. The automotive vehicle of claim 14 wherein said head portion includes a grille assembled into said head portion to prevent the entry of objects into said inlet opening.

17. A side door assembly for an automotive vehicle comprising:
- a door shell separating an interior portion of said side door assembly and an exterior surface of said side door assembly;
- a primary seal mounted on said interior surface of said door shell;
- a secondary seal surface engagable with a secondary seal that is spaced laterally from said primary seal to define an air bind area between said primary and secondary seals; and
- a grommet assembly mounted in said door shell between said primary seal and said secondary seal to form a vent for the movement of air from said air bind area into said interior portion of said door assembly said grommet assembly including:
- a head portion engageable with said shell to defining an inlet opening through said shell for flow communication of air between said air bind area and an interior of said door assembly;
- a snorkel portion formed as a hollow tubular member having said head portion at one end thereof and terminating in an opposing distal opening, said snorkel portion undergoing a bend such that said distal opening will be positioned below said inlet opening when properly installed in said door shell to restrict movement of moisture from within said interior of said door assembly and said air bind area; and
- a grille to prevent the entry of objects into said inlet opening, said snorkel portion including a contoured lip extending around said distal opening and projecting outwardly from said snorkel portion to deflect water away from said distal opening.

* * * * *